US012794893B2

(12) United States Patent
Gagliardoni

(10) Patent No.: US 12,794,893 B2
(45) Date of Patent: Nov. 10, 2026

(54) ACCESS MANAGEMENT SYSTEM AND ASSOCIATED COMPUTER-IMPLEMENTED METHODS

(71) Applicant: NAGRAVISION SARL, Cheseaux-sur-Lausanne (CH)

(72) Inventor: Tommaso Gagliardoni, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 105 days.

(21) Appl. No.: 18/712,198

(22) PCT Filed: Nov. 23, 2022

(86) PCT No.: PCT/EP2022/083014
§ 371 (c)(1),
(2) Date: May 21, 2024

(87) PCT Pub. No.: WO2023/094467
PCT Pub. Date: Jun. 1, 2023

(65) Prior Publication Data

US 2024/0414163 A1 Dec. 12, 2024

(30) Foreign Application Priority Data

Nov. 23, 2021 (EP) .................................... 21250009

(51) Int. Cl.
*H04L 9/40* (2022.01)
*H04L 9/30* (2006.01)

(52) U.S. Cl.
CPC .............. *H04L 63/101* (2013.01); *H04L 9/30* (2013.01)

(58) Field of Classification Search
CPC ................................ H04L 63/101; H04L 9/30
See application file for complete search history.

(56) References Cited

U.S. PATENT DOCUMENTS 11,757,645 B2 * 9/2023 Sugarev .................. G06F 21/41
2006/0248600 A1 * 11/2006 O'Neill .................. H04L 63/08
707/E17.107

(Continued)

OTHER PUBLICATIONS

European Search Report dated May 13, 2022, for European Patent Application No. 21250009.4; 11 pages.

(Continued)

*Primary Examiner* — Yonas A Bayou
(74) *Attorney, Agent, or Firm* — POLSINELLI LLP

(57) ABSTRACT

An access management system for controlling access to an electronic resource is provided, wherein the electronic resource accessible at a resource address, and provided by a service provider having associated therewith an electronic provider address, the system comprising: a request management module, configured to determine whether a registration request received at the electronic provider address is a valid registration request, wherein: the registration request includes a public key or data identifying the public key, associated with a client device or user thereof from which the registration request is received; and an authorized client management module configured to add the public key of the user, or data identifying the public key, to an authorized list, if the request management module determines that the registration request is a valid registration request, wherein: when a public key or data identifying the public key of the client device is on the authorized list, the client device or user thereof is permitted to access the electronic resource. Another similar access management system and associated computer-implemented methods are also provided.

19 Claims, 10 Drawing Sheets

(56) References Cited

U.S. PATENT DOCUMENTS

| | | | | |
|---|---|---|---|---|
| 2014/0189346 | A1* | 7/2014 | Cureton | G06F 21/105<br>713/155 |
| 2015/0006882 | A1* | 1/2015 | Hernandez | H04L 63/06<br>713/155 |
| 2017/0118202 | A1* | 4/2017 | Mathew | G06F 21/445 |
| 2019/0342085 | A1* | 11/2019 | Kube | H04L 9/3247 |
| 2020/0059455 | A1* | 2/2020 | John | H04L 9/0825 |
| 2021/0112041 | A1* | 4/2021 | John | H04L 63/0442 |
| 2022/0200995 | A1* | 6/2022 | Morin | H04L 63/101 |

OTHER PUBLICATIONS

International Search Report and Written Opinion for PCT Application No. PCT/EP2022/083014 dated Feb. 14, 2023; 12 pages.

* cited by examiner

ACCESS MANAGEMENT SYSTEM AND ASSOCIATED COMPUTER-IMPLEMENTED METHODS

CROSS-REFERENCES TO RELATED APPLICATIONS

This application is a U.S. National Stage of PCT Application No. PCT/EP2022/083014, filed Nov. 23, 2022, which claims the priority benefit of European Patent Application No. 21250009.4 filed on Nov. 23, 2021, both of which are incorporated herein by reference in their entirety for all purposes.

TECHNICAL FIELD OF THE INVENTION

The present invention relates to an access management system for controlling access to an electronic resource. Associated computer-implemented methods are also provided.

BACKGROUND TO THE INVENTION

When a user wishes to register for a new service, such as an internet forum, a website, or a new product, the service provider invariably requires that the user registers a new account. Generally, this requires the user to provide a personal (valid) email address, a suitable username, and a password. Often, the user must also receive an authentication code via email. The user must then remember the username and password for subsequent access. Often, the user also needs to provide a valid mobile phone number, credit card details, and even a copy of their ID or proof of address. This is cumbersome for the user and the service provider, and is requires that the user expose their personal data. This is undesirable for privacy regulations, and also represents a liability for the service provider.

Alternatives have been provided to this "traditional" approach. Universal logins, such as the familiar "Login with Facebook" or "Login with Google" are offered by many websites nowadays. This partially solves the problem by invoking a trusted third party, and these systems are often designed with advanced privacy-preserving techniques (e.g. zero-knowledge, remote attestation). However, the systems still rely on a central authority to work, which comes with its own disadvantages. For example, if the Google authenticator portal is offline, a user cannot access the service in this manner even if the service is available. Also, this approach enforces a systemic reliance on these third parties, which then become a single point of failure, often for critical services and without proper regulatory oversight. Most importantly, these alternative systems:

- do not remove the requirement for a cumbersome registration process, they just limit it to a single initial setup;
- do not remove the liability for these central authorities, who then end up collecting a large amount of personal data and therefore expose themselves to targeted attacks; and
- do not remove the risk for users, who still have to share personal information with third parties, and with no other guarantees and safeguards than those merely given by limited and hard-to-enforce legal devices such as GDPR.

These systems fail to address the question of why the service provider should always be in control of the identity of the user requesting a service. This is not the case for most everyday real-world services: we do not have to provide ID when buying food at a supermarket; when buying alcohol, we only have to provide ID as a proof of age—our other data is irrelevant, and is not stored. Generally, a service provider cares only about whether a user is paying for the service, and their personal information is incidental.

The present invention aims to address these issues.

Furthermore, it is well-known to users and service providers alike that the value of a certain service can fluctuate over time as a consequence of supply vs. demand. However, it is highly non-trivial for the service provider to adjust pricing in real time while giving reliable guarantees of service availability to paying customers. For example, if a customer pays upfront a yearly membership fee for accessing a certain resource, but then the price of the resource increases due to market fluctuations, the service provider is at a loss. Likewise, if the price drops, the customer is at a loss. One possible solution that has been adopted for certain services is that of using a prepaid account: the customer deposits a certain amount of funds, and those funds are depleted over time at a rate which is dependent on the market value of the resource. However, unlike normal deposits, for prepaid bill accounting systems, there is no way for a user to recoup leftover funds if they decide to cancel the subscription before it ends.

Certain aspects of the present invention aim to address this issue as well.

SUMMARY OF THE INVENTION

At a high level, the present invention addresses the problems outlined above by providing systems and methods in which, when a request is validated, a user's public key (or information identifying the public key) is placed on a list of authorized public keys, wherein users whose public keys are on the list are permitted to access the an electronic resource. Further aspects of the invention provide systems and methods which are modified to enable an auction capability which addresses the issues associated with the variations in cost of a resource. These are discussed later in this application.

An access management system for controlling access to an electronic resource, the electronic resource accessible at a resource address, and provided by a service provider having associated therewith an electronic provider address, the system comprising: a request management module, configured to determine whether a registration request received at the electronic provider address is a valid registration request, wherein: the registration request includes a public key or data identifying the public key, associated with a client device or user thereof from which the registration request is received; an authorized client management module configured to add the public key of the user, or data identifying the public key, to an authorized list, if the request management module determines that the registration request is a valid registration request, wherein: when a public key or data identifying the public key of the client device is on the authorized list, the client device or user thereof is permitted to access the electronic resource. Herein, the public key referred to above may be a public verification key which is used to identify the user through validation of a signature generated using a private signature key of the user (or client device). In some cases, the public key referred to here may be a public encryption key which is used to encrypt a session key (discussed in detail later on in this application). This is discussed in more detail later on.

Throughout this application, where we refer to a "client device", this should be understood to mean "a client device or a user thereof". Similarly, where we refer to a "public key ID", this should be understood to mean "a public key or data identifying the public key". These abbreviations are used to improve the clarity and conciseness of the follow disclosure.

In this way, no personal information related to a user of a client device, who wishes to access the electronic resource, is ever transmitted or stored. This enables a user to access an electronic resource, such as an online resource, without risk of their personal data being obtained by malicious actors.

In some cases, the electronic provider address may be a blockchain address. Specifically, the electronic provider address may be an address of a blockchain wallet, to which funds may be transferred, which is associated with the service provider. In particularly preferred case, the transaction would me made using a cryptocurrency with anonymity features, further adding to the security provided by the invention. An example of a cryptocurrency which may be used in implementations of the present invention is Monero. In some cases, particularly those cases which involve transferring funds using a blockchain, the registration request preferably includes a signature which is generated using a private signature key associated with the client device from which the registration request is received. This may be done so that the request management module or management software of the blockchain wallet is able to confirm that the user who sends the registration request to the electronic provider address is indeed who they claim to be. In these cases where the registration request is in the form of a blockchain transaction, the public verification key is preferably included in the request (i.e. the public verification key which is complementary to the private key which is used to generate the signature). It is this public verification key (or a related ID thereof) which may be added to the authorized list, if it is determined that the registration request is a valid request. This is convenient, because it means that unique identification can be stripped straight from the registration request when it is determined that it is valid, without requiring any personal information about the user. The user's personal information therefore remains entirely secure.

In some cases, the registration request may further include a public encryption key associated with the client device. In these cases, when data is encrypted using the public encryption key associated with the client device, it may be decrypted using a private decryption key to which only the client device in question has access.

We now consider how the validation process takes place. Specifically, the request management module may be configured to determine whether the registration request received at the electronic provider address meets a validation criterion, wherein: if the request management module determines that the request received at the electronic provider address meets the validation criterion, it is determined that the request is a valid request; and if the request management module determines that the request received at the electronic provider address does not meet the validation criterion, it is determined that the request is not a valid request. In some cases, the request management system may be configured to determine whether a quantity associated with the registration request received at the electronic provider address is greater than or equal to a predetermined value, wherein: if the request management system determines that the quantity associated with the registration request received at the electronic provider address is greater than or equal to the predetermined value, it is determined that the registration request is a valid registration request; and if the request management system determines that the quantity associated with the registration request received at the electronic provider address is less than the predetermined value, it is determined that the registration request is not a valid registration request. In these cases, the validation criterion is that the quantity associated with the registration request is greater than or equal to the predetermined value. Systems according to this example are useful in enabling commercial transactions, e.g. via a blockchain, as discussed above.

The access management system may not only be configured to process a single registration request. Specifically, the request management module may be configured to determine whether each request of a plurality of registration requests received at the electronic provider address is a valid registration request, each of the registration requests including a respective public key ID associated with the client device from which the registration request is received. Furthermore, the authorized client management module may be configured to add the respective public key ID of the client device associated with each of the valid requests to the authorized list. In some cases if a registration request of a client device is not granted, then that client device may be placed on a waiting list (e.g. in the event that a threshold requirement to be placed on the authorized list is lowered). In this way, the access management system is able to deal with a plurality of registration requests. The access management system may be configured to deal with the requests one at a time, or simultaneously in a single parallel operation.

The above disclosure relates to a registration process, whereby a client device is essentially registered or subscribed to an electronic resource. Examples of resources include streaming services such as Netflix or Spotify, online games such as World of Warcraft and Fortnite, online newspapers, and any other online content which is associated with a subscription.

Next, we consider how the client device actually comes to access the electronic resource, using an authorization module. Specifically, the access management system may further comprise an authorization module, which is preferably equipped to deal with access requests from client devices. Herein, an access request, is a request actually to access the electronic resource, rather than just registering to be able to access the resource. The authorization module (or alternatively, the request management module) may be configured to receive an access request from a client device, the access request, as discussed, indicating that the client device would like to access the electronic resource which is stored at the resource address. Such an access request may include the public key ID associated with the client device from which the access request is received. In addition, the access request may further include a public encryption key associated with the client device. Including the encryption key in the access request is advantageous in some circumstances because it minimizes the amount of metadata which needs to be transmitted in the initial registration request. The structure of the registration request is explained in more detail later on in the application with reference to FIG. 3, which should further clarify this advantage. In response to receiving the access request from the client device, the authorization module may be configured to determine whether the public key ID which is included in the access request is included in the authorized list. In other words, the authorization module verifies whether the sender of the access request is actually registered to access the electronic resource. In those cases where the authorization module determines that the public key ID is included in the authorized list, the authorization module is subsequently configured to grant the client device access to the electronic resource.

Access to the electronic resource is preferably granted by availing the client device of a session key which may be used to access the electronic resource. Of course, it is desirable not simply freely to broadcast the session key, in case such a signal is intercepted. Accordingly, the authorization module may be configured to grant the client device access to the electronic resource by encrypting a session key with a public encryption key associated with the client device, to generate an encrypted session key, and sending the encrypted session key to the client device, the encrypted session key being decryptable by a user using a private decryption key which is complementary to the public encryption key, and the decrypted session key being usable to access the electronic resource at the resource address. It will be noted that the encryption key may be retrievable from either the access request or the original registration request, in which case it is preferably stored to a memory of the access management system for later retrieval.

The session key may be a one-use session key, allowing the user to access the electronic resource a single time. For example, after the session key is used once, it may expire. In some cases in order to further heighten security, and also for increased control as to who is able to access the electronic resource, the session key may be a rotating session key. In other words, the session key may be updated on a regular (preferably periodic) basis. Specifically, the session key may be a rotating session key which changes to a new session key after a predetermined period of time; and wherein, when the session key changes, the authorization module is configured to encrypt the new session key with the encryption key of each client device whose public key ID is included in the authorized list in order to generate a new encrypted session key, and to send the new encrypted session key to the or each client device.

In certain cases, the validation criterion which determines which subset of client devices who have made registration requests are placed on the authorized list may be variable. Specifically, the request management module may be configured to change the validation criterion. Such a change may result in certain client devices (or specifically, their registration request) now meeting the criterion, when they didn't before, or certain client devices whose registration requests previously met the criterion no longer meeting the criterion. After the validation criterion has been changed, the request management module may be configured to determine whether the registration requests of the client devices whose public key IDs are included in the authorized list meet the updated validation criterion, and to identify those which do not, i.e. the no-longer valid registration requests. The request management module may then be configured to generate instructions configured to cause the authorized client management module to remove the public key IDs associated with the client devices whose registration requests are no longer valid from the authorized list. On the other hand, the request management module may also be configured to determine whether the registration request of client devices who have been placed in the waiting list (see earlier) meet the updated validation criterion. For those that do, the request management module may be configured to generate instructions configured to cause the authorized client management module to add the public key IDs associated with those client devices onto authorized list. In this manner, the present invention provides an access management system which is able to dynamically manage the client devices which are able to access a specific electronic resource while not requiring that individuals need to submit any personal information at all, nor to register with the service provider itself.

A second aspect of the invention provides a computer-implemented method of controlling access to an electronic resource, the electronic resource accessible at a resource address, and provided by a service provider having associated therewith an electronic provider address, the method comprising: determining whether a registration request received at the electronic provider address is a valid registration request, the request including a public key ID associated with a client device from which the registration request is received; if it is determined that the registration request is a valid registration request, adding the public key ID associated with the client device to an authorized list, wherein when a public key ID of the user is on the authorized list, the client device is permitted to access the electronic resource. The optional features set out above, with reference to the first aspect of the invention, also apply equally well to the second aspect of the invention.

A third aspect of the invention which is similar to the first addresses the situation in which a plurality of registration requests is received, and then a decision regarding the results of the registration requests is made "in bulk". As we demonstrate, access management systems of the third aspect of the invention may be used to implement an auction function.

Specifically, a third aspect of the invention provides: an access management system for controlling access to an electronic resource, the electronic resource available at a resource address, and provided by a service provider having associated therewith an electronic provider address, the system comprising: a request management module configured to process a plurality of registration requests received at the electronic provider address, each of the registration requests including a respective public key ID associated with the client device from which the request is received, wherein processing the plurality of registration requests comprises: selecting only those registration requests of the plurality of requests which meet a predetermined validation criterion; and/or ranking the registration requests based on ranking data contained in the registration request, and selecting one or more of the registration requests based on a selection criterion; an authorized user management module configured to add the public key IDs associated with the client devices from which the selected registration requests were received to an authorized list, wherein: when a public key ID of a client device is on the authorized list, that client device is able to access the electronic resource. It will be noted that the optional features set out previously in this application in respect of the first aspect of the invention apply equally well to this third aspect of the invention, unless clearly incompatible, or where context dictates otherwise. In particular, the operation of the request management module (specifically with regard to determining how a validation criterion is met, and the authorization module may be as set out previously.

In some cases, the request management module, or other component, may be configured to change the validation criterion, the selection criterion, and/or the ranking data. Such a change may result in certain client devices (or specifically, their registration request) now meeting a criterion, when they didn't before, or certain client devices whose registration requests previously met a criterion no longer meeting the criterion. After the validation criterion has been changed, the request management module may be configured to determine whether the registration requests of the client devices whose public key IDs are included in the authorized list meet the updated criteria, and to identify those which do not, i.e. the no-longer valid registration requests. The request management module may then be configured to generate instructions configured to cause the authorized client management module to remove the public key IDs associated with the client devices whose registration requests are no longer valid from the authorized list. On the other hand, the request management module may also be configured to determine whether the registration request of client devices who have been placed in the waiting list (see earlier) meet the updated criterion. For those that do, the request management module may be configured to generate instructions configured to cause the authorized client management module to add the public key IDs associated with those client devices onto authorized list. In this manner, the present invention provides an access management system which is able to dynamically manage the client devices which are able to access a specific electronic resource while not requiring that individuals need to submit any personal information at all, nor to register with the service provider itself.

A fourth aspect of the invention provides a computer-implemented method for controlling access to an electronic resource, the electronic resource available at a resource address, and provided by a service provider having associated therewith an electronic provider address, the method comprising: processing a plurality of registration requests received at the electronic provider address, each of the registration requests including a respective public key ID associated with the client device from which the registration request is received, wherein processing the plurality of registration requests comprises: selecting only those registration requests of the plurality of registration requests which meet a predetermined validation criterion; and/or ranking the registration requests based on ranking data contained in the registration request, and selecting one or more of the registration requests based on a selection criterion; adding the public key IDs associated with the client devices from whom the selected registration requests were received to an authorized list, wherein when a public key ID of a client device is on the authorized list, that client device is able to access the electronic resource. Optional features set out above in respect of the first and third aspects of the invention apply equally well to the fourth aspect of the invention except where they are clearly incompatible, or context dictates otherwise.

Additional aspects of the invention provide: a computer program (or computer program product) comprising instructions which, when the program is executed by a computer, cause the computer to carry out the method of the second and/or fourth aspect of the invention; a computer-readable medium having stored thereon the computer program (or computer program product) of the previous aspect of the invention.

The invention includes the combination of the aspects and preferred features described except where such a combination is clearly impermissible or expressly avoided.

BRIEF DESCRIPTION OF THE DRAWINGS

Embodiments of the present invention will now be described with reference to the accompanying drawings, in which.

DETAILED DESCRIPTION OF THE DRAWINGS

Aspects and embodiments of the present invention will now be discussed with reference to the accompanying figures. Further aspects and embodiments will be apparent to those skilled in the art. All documents mentioned in this text are incorporated herein by reference.

Figure 1:
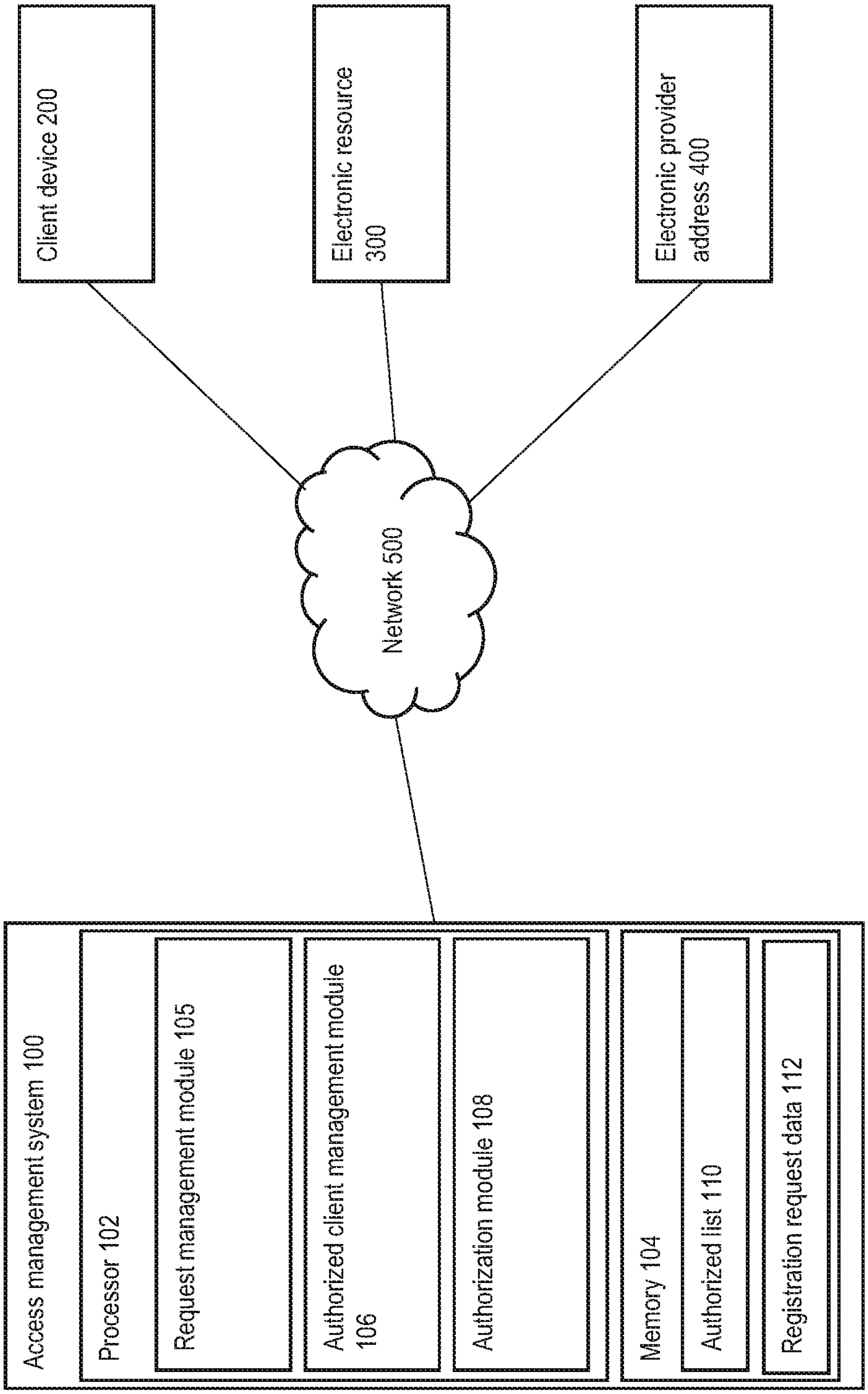
FIG. 1 shows a high-level system diagram including an access management system according to a first aspect or third aspect of the present invention.

In at least one aspect, the present invention relates to an access management system which is able to ensure that user's can access an electronic resource without the requirement of supplying personal data to the service provider. FIG. 1 shows a high-level system diagram of an overall system which illustrates the functionality of the present invention. The system includes an access management system 100, a client device 200, an electronic resource 300 (located at an electronic resource address), and an electronic provider address 400. The client device 200 (or, depending on context, a user of the client device 200) may wish to access an electronic resource 300, which is located at an electronic resource address. In order to do so, the client device 200 may first send a registration request to either the access management system 100 or the electronic provider request 400. Based on the outcome of that registration request, the client device 200 may be placed on an authorized list 112. The client device 200 may then send an access request to the access management system 100. These processes are explained in more detail throughout this application. The access management system 100, client device 200, electronic resource 300, and electronic provider address 400 may be connected via a network 500. The network 500 may be a wired network, but in preferred cases, the network 500 is a wireless network, such as a Wi-Fi network, a cellular network, or most preferably, the internet. It should be noted that although FIG. 1 shows all of the components being connected via network 500, in some cases, they may be connected by more than network (e.g. each pair of components may be connected via a separate network).

Before discussing its operation, we describe the structure of the access management system 100 in more detail. The access management system 100 may include a processor 102 and a memory 104. The processor 102 may include a request management module 105, an authorized client management module 106, and an authorization module 108. The memory 104 may include an authorized list 110, and registration data 112.

Figure 2:
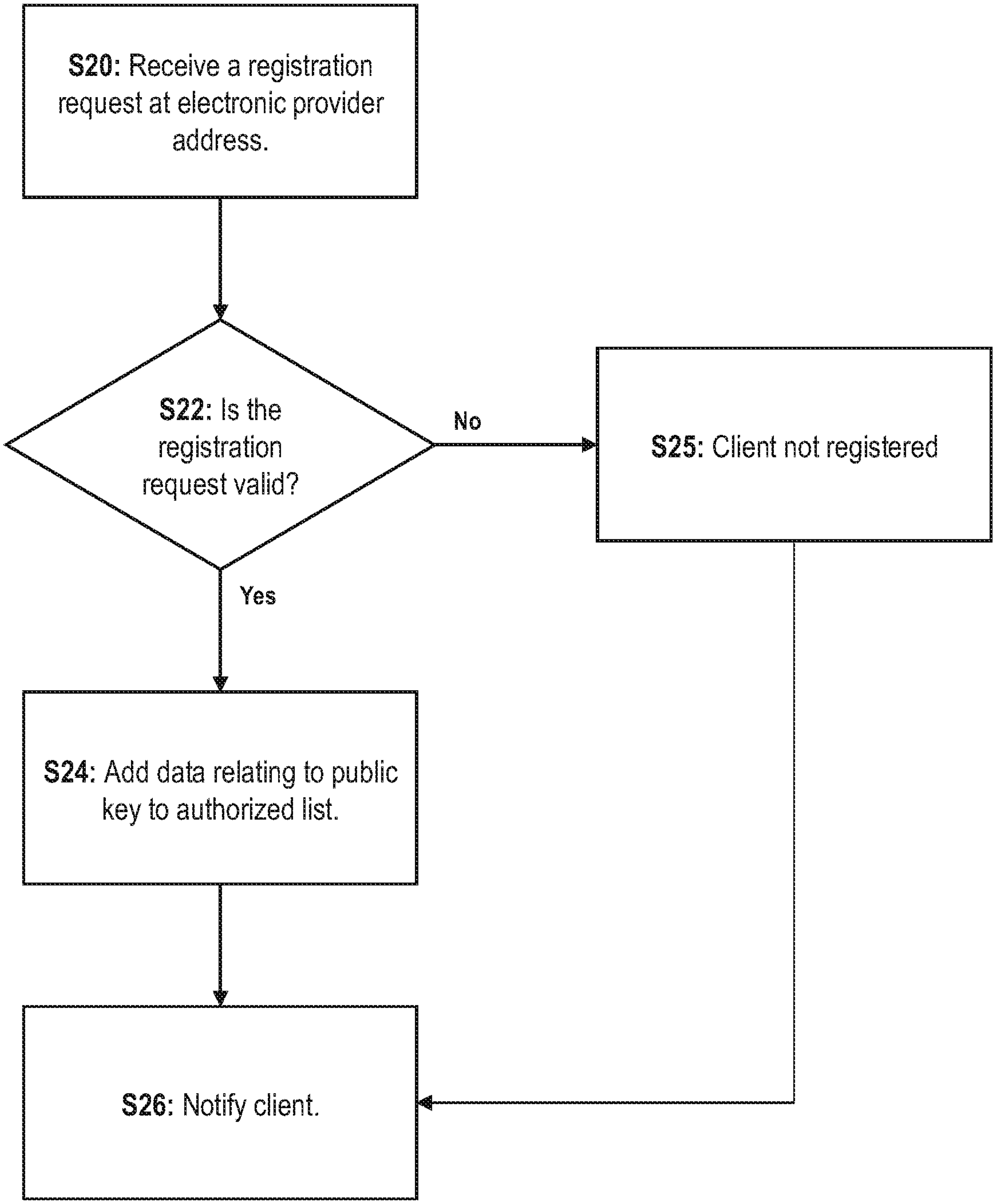
FIG. 2 is a flowchart illustrating a registration process according to the first and second aspects of the invention.
Figure 3:
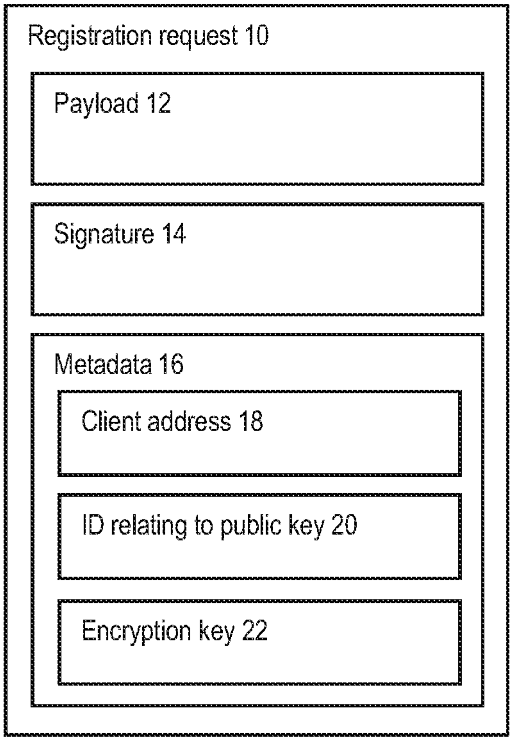
FIG. 3 is an example of a registration request which may be received by the access management system.

FIG. 2 is a flowchart illustrating, at a high-level, a registration process according to the first aspect of the invention. In a first step S20, a registration request 30 from client device 200 may be received at the electronic provider address 300. An example of a registration request 10 is shown in FIG. 3. Registration request 10 may include a payload 12, a signature 14, and metadata 16. The metadata 16 may include a client address 18, which indicates to the request management module 105 where e.g. notifications and other data intended for a given client device 200 should be sent. The metadata may further include an ID relating to the public key 20. This is an important feature, since it is the ID relating to the public key 20 which is stored on the authorized list 110 in order to confirm that the client device 200 associated with that ID is permitted to access the electronic resource 300. In alternative cases, instead of the metadata 16 of the registration request 10 including an ID related to the public key of the client device 200, it may include the public key itself—both approaches are valid, and throughout this application, where we refer to an ID relating to the public key 20, a public key ID, or the like, it should be understood that the term is interchangeable with just the public key, unless context dictates otherwise. Finally, the metadata 16 may include an encryption key 22. In cases where the registration request 10 includes an encryption key 22, it is preferably stored e.g. by the registration request module 105 in the registration data 112 of the memory 104 of the access management system 100 in association with the ID related to the public key 20.

The signature 14 is preferably generated using a private signature key associated with the client device 200 or a user thereof. This means that the signature may be verified using a public verification key which is sent to e.g. the electronic provider address 400 or e.g. the request management module 105 of the access management system 100, in the registration request 10. The nature of the payload 12 is discussed shortly, with reference to FIG. 4.

Upon receive the registration request, the request management module 105 may determine whether the registration request 10 is a valid request, in decision step S22. In the event that the registration request 10 is valid, the authorized client management module 106 may then add the public key 20 associated with the client device 200 from which the registration request 10 was received to the authorized list 110. The authorized list 110 preferably includes a list of client devices 200 who are permitted to access the electronic resource 300 based on the results of the determination in step S22. If it is determined in step S22 that the registration request 10 is not a valid request, the client device 200 from which the registration request 10 was received may not be registered, i.e. the public key ID will not be added to the authorized list 110. Then, in both cases (i.e. registered and not registered), the user may be notified of the result in step S26, at the client address 18 in the metadata 16 of the registration request 10.

Figure 4:
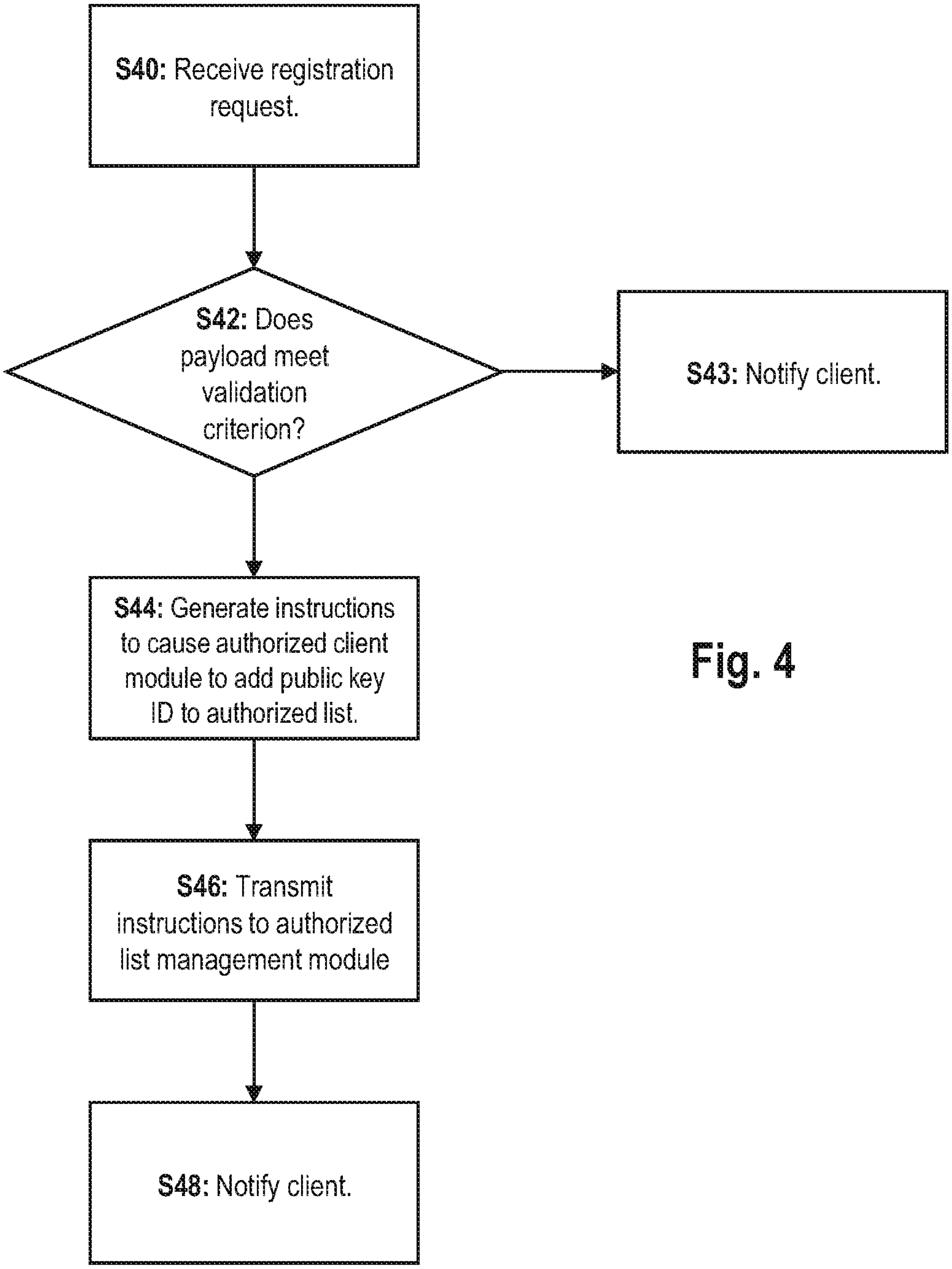
FIG. 4 is a flowchart illustrating some of the functions of the request management module.

FIG. 4 shows more detail of the process performed by the request management module 105. In step S40, the registration request 10 may be received, e.g. at the electronic provider address 400 or the request management module 105 itself. Then, in step S42, the request management module 105 may determine whether the payload 12 of the registration request 10 meets some predetermined validation criterion. In some implementations of this invention, the electronic provider address 400 may be the address of a blockchain wallet associated with the electronic service provider. In such cases, the payload 12 may indicate the amount of funds to be transferred from the client device 200 to the blockchain wallet of the service provider. In such cases, the validation criterion may include a cost associated with access to the electronic resource 300, and the request management module 105 may be configured to compare the amount of funds indicated in the payload 12 with the cost. If it is determined that the payload 12 does not match the validation criterion, the client device 200 from which the registration request 10 was received may not be registered on the system, and they may be notified accordingly in step S43. Conversely, if it is determined that the payload 12 does meet the validation criterion, then the requestion management module 105 may, in step S44, generate instructions which cause the authorized client module 106 to add the public key ID 20 from the registration request to the authorized list 110 in memory 104, and transmit the instructions accordingly in step S46. The request management module 105 may then notify the user accordingly. In some cases, the request management module 105, or the processor 102 of the access management module 100 more generally may include a notification module (not shown) which may be configured to generate and transmit notifications.

Figure 5A:
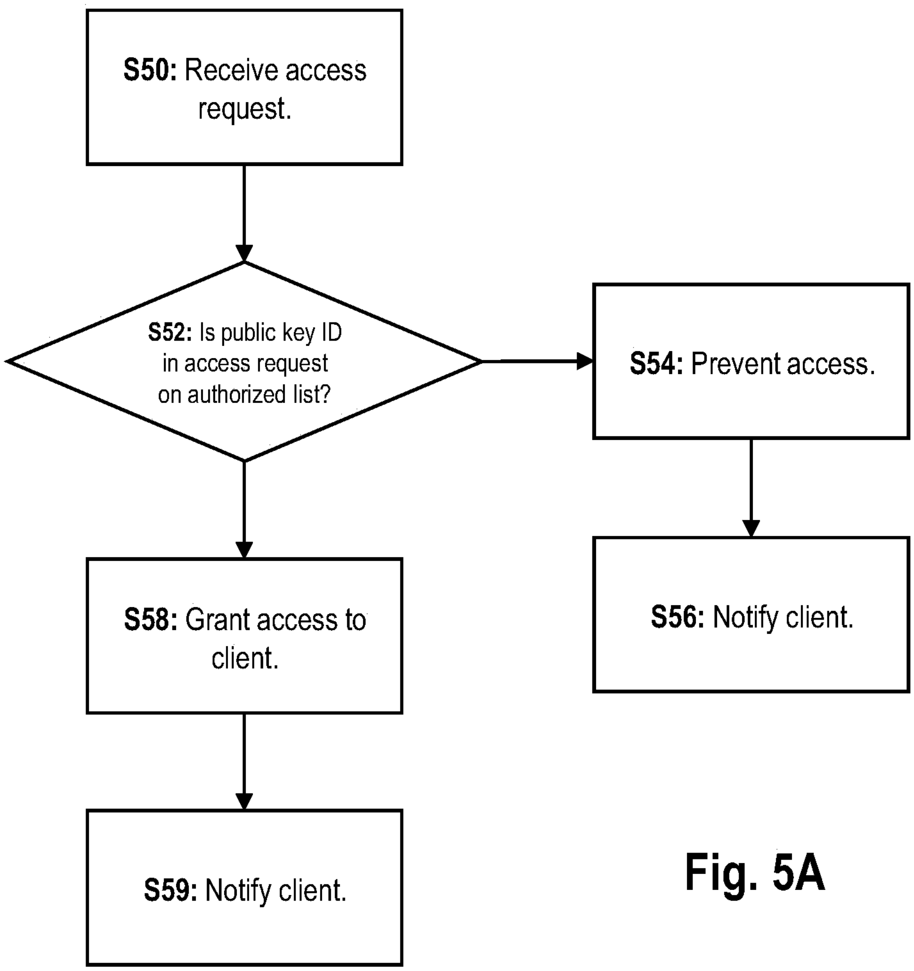
FIG. 5A is a flowchart illustrating some of the functions performed by the authorization module.
Figure 5B:
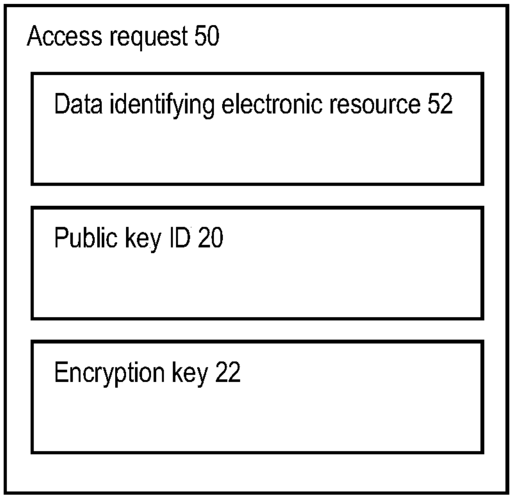
FIG. 5B is an example of an access request which may be received by the access management system.

The processes outlined above relate to the initial registration of a client device 200 with the electronic service provider via the access management module 100. Once a client device 200 is registered, the user thereof (or, for that matter, a user who is not registered) may then wish to access the electronic resource 300. In order to do so, an access request is generated and sent to the access management system 100. FIG. 5A shows an example of a process which may be performed to process the access request. In step S50, the access management system 100, preferably the authorization module 108 thereof, may receive the access request 20. FIG. 5B shows an example of an access request 50, which may include data 52 identifying the electronic resource 300, a public key ID 20 associated with the client device 200, and an encryption key 22 associated with the client device 200. In cases in which the encryption key 22 is included in the client device 200's original registration request 10, then it is not necessary for the access request 50 to include the encryption key 22. It should be noted that FIG. 5B is not exhaustive—the access request 50 may include other data as well. In step S52 of FIG. 5A, the authorization module 108 may determine whether the public key ID included in the access request 50 is present in the authorized list 110. If not, then access by the client device 200 to the electronic resource 300 is prevented in step S54, and in step S56 a notification is sent accordingly. If the public key ID 20 is included in the authorized list 110, then the authorization module 108 grants the client device 200 access to the electronic resource in step S58, and notifies them accordingly in step S59.

Figure 6:
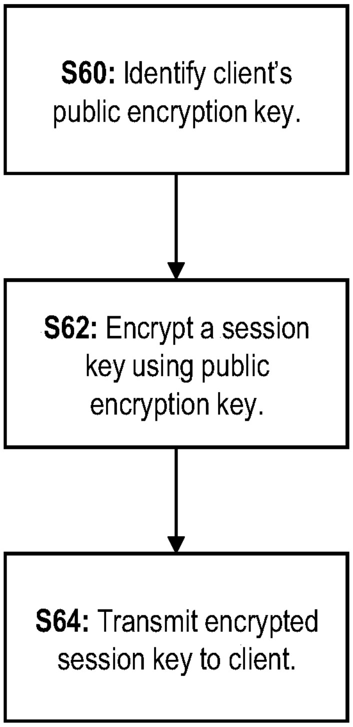
FIG. 6 is a flowchart illustrating how access is granted to the electronic resource.

We now consider how the client device 200 maybe authorized to access the electronic resource 300, and how access is actually granted. An exemplary process is shown in FIG. 6. Essentially, when a client device 200 is granted access to the electronic resource 300, they are provided with a session key which gives them access to it. In step S60, the encryption key 22 associated with the client device 200 in question is identified. For example, if the encryption key 22 was initially delivered in the registration request 10, and stored in the registration request data 112, then the authorization module 108 may perform a lookup in the registration request data 112 to identify the encryption key 22 associated with the public key ID 20 which was present in the access request 50. Alternatively, in a simpler case, if the encryption key 22 formed part of the access request 50, then the encryption key 22 may simply be retrieved therefrom. Once the encryption key 22 has been identified, the authorization module 108 (or optionally an encryption module, not shown, thereof) may then encrypt the session key using the encryption key 22 in step S62. It should be noted, for completeness, that data which is encrypted using the encryption key 22 is decryptable by a private decryption key which is possessed only by the client device 200, in order to ensure that only that client device 200 is able to access the session key which is encrypted using their own (public) encryption key 22. Once the session key has been encrypted, the encrypted session key may then, in step S64, be transmitted to the client device 200, at which point the client device 200 may decrypt the session key, and use the session key to access the electronic resource 300. Thus, access is granted to the electronic resource 300. In some cases, as discussed elsewhere, rather than generating encrypted session keys using the respective encryption key 22 of each client device 200, a broadcast encryption scheme may be used.

Figure 7:
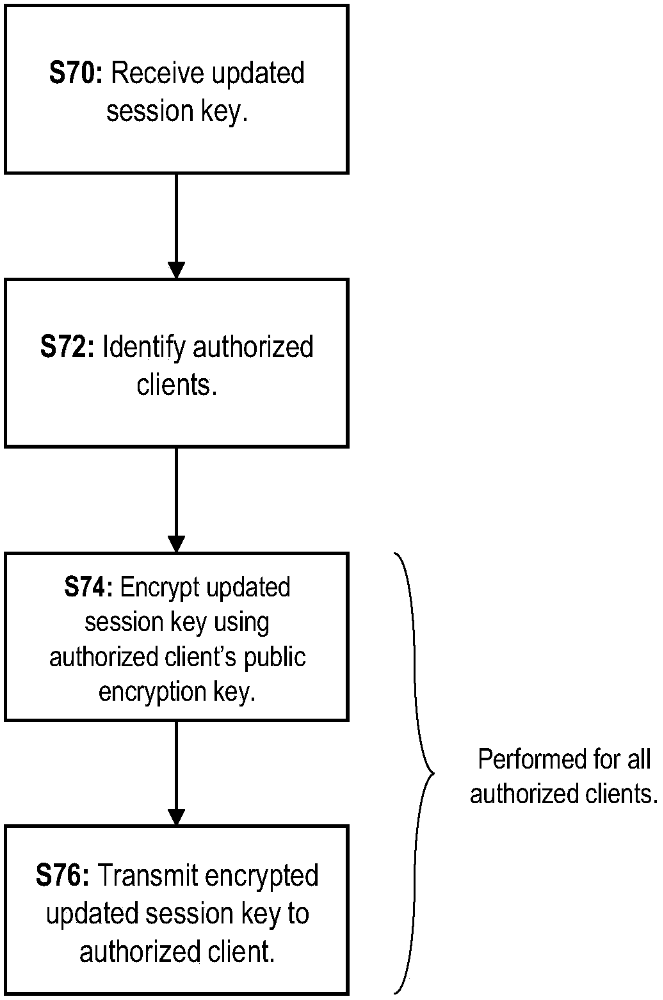
FIG. 7 is a flowchart illustrating the process by which the session key is changed, and the authorized client devices updated.

For added security, the session key may change on a regular, preferably periodic basis. The session key may change every minute, or hourly, or may change a plurality of times per day. It may change daily, may change every 2, 3, 4, 5, or 6 days. The session key may change weekly, or monthly. The frequency with which the session key changes is preferably based on the intended application. Of course, if the session key changes, then it is necessary to keep the registered client devices 200 updated as well, in order to ensure that they remain able to access the electronic resource. This process is illustrated in FIG. 7. In a first step, the authorization module 108 may receive the updated session key. Alternatively, the authorization module 108 may generate the updated session key itself. The process by which the session key is generated is preferably random. Then in step S72, the authorization module 108 may identify all authorized client devices 200, i.e. those client devices 200 whose public key ID 20 is present on the authorized list 110. Once these authorized client devices 200 have been identified, the authorization module 108, for each authorized client device 200, may encrypt the updated session key in step S74, using the client device's encryption key 22 (this may be obtained as outlined in the previous paragraph).

Finally, in step S76, the encrypted updated session key may be transmitted to the authorized client device 200. In some cases, as discussed elsewhere, rather than generating encrypted updated session keys using the respective encryption key 22 of each authorized client device 200, a broadcast encryption scheme may be used.

Figure 8:
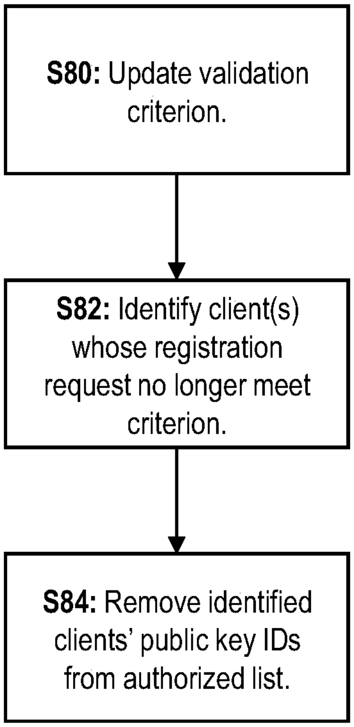
FIG. 8 is a flowchart illustrating a process in which the validation criterion is changed, and the public key IDs of some client devices are removed from the authorized list.

In some cases, it may be desirable to change the validation criterion. For example, in a commercial setting, this may be done in order to alter the price of accessing the electronic resource. The present invention provides a means of doing so. FIG. 8 shows an outline of a process by which the authorized list 110 can be updated based on a change in a validation criterion. In a first step S80, the validation criterion may be updated, e.g. by the request management module 105. This may correspond to an increase in the price of the electronic resource 300 provided. Then, in step S82, those client devices 200 the content of whose registration requests 10 no longer meet the validation criteria are identified. This may be achieved, for example, by the registration management module 105 re-evaluating all of the registration requests 10 (preferably the payloads 12 thereof), which may be stored in e.g. the registration request data 112 in association with the public key ID. Having identified the public key IDs 20 of the no-longer-permitted client devices 200, the authorized client management module 106 may then remove these public key IDs 20 from the authorized list 110. How, then, do these client devices 200 actually lose access to the electronic resource 300? In some cases, for example, the client device 200 may send an access request 50, which will then be denied by the authorization module 108 because the public key ID is no longer on the authorized list. Alternatively, in cases where the session key changes, the client device 200 will not be sent an updated session key because they are only sent to client devices 200 on the authorized list 110.

The above disclosure relates to the first aspect of the invention, which focuses on registration and authorization aspects of the access management system 100. The final feature of the invention, described in the preceding paragraph, relates to changing a validation criterion, and in doing so, automatically changing which client devices 200 are able to access an electronic resource 300. A further aspect of the invention provides for a process in which rather than being decided on a one-by-one basis, an access management system 100 may receive a plurality of registration requests 10, but may only be able to accept a subset of these. The present invention thereby enables a kind of bidding, or auction functionality. It should be stressed here that the invention lies within the novel implementation of an auction process, rather than with the actual auction process itself.

Figure 9:
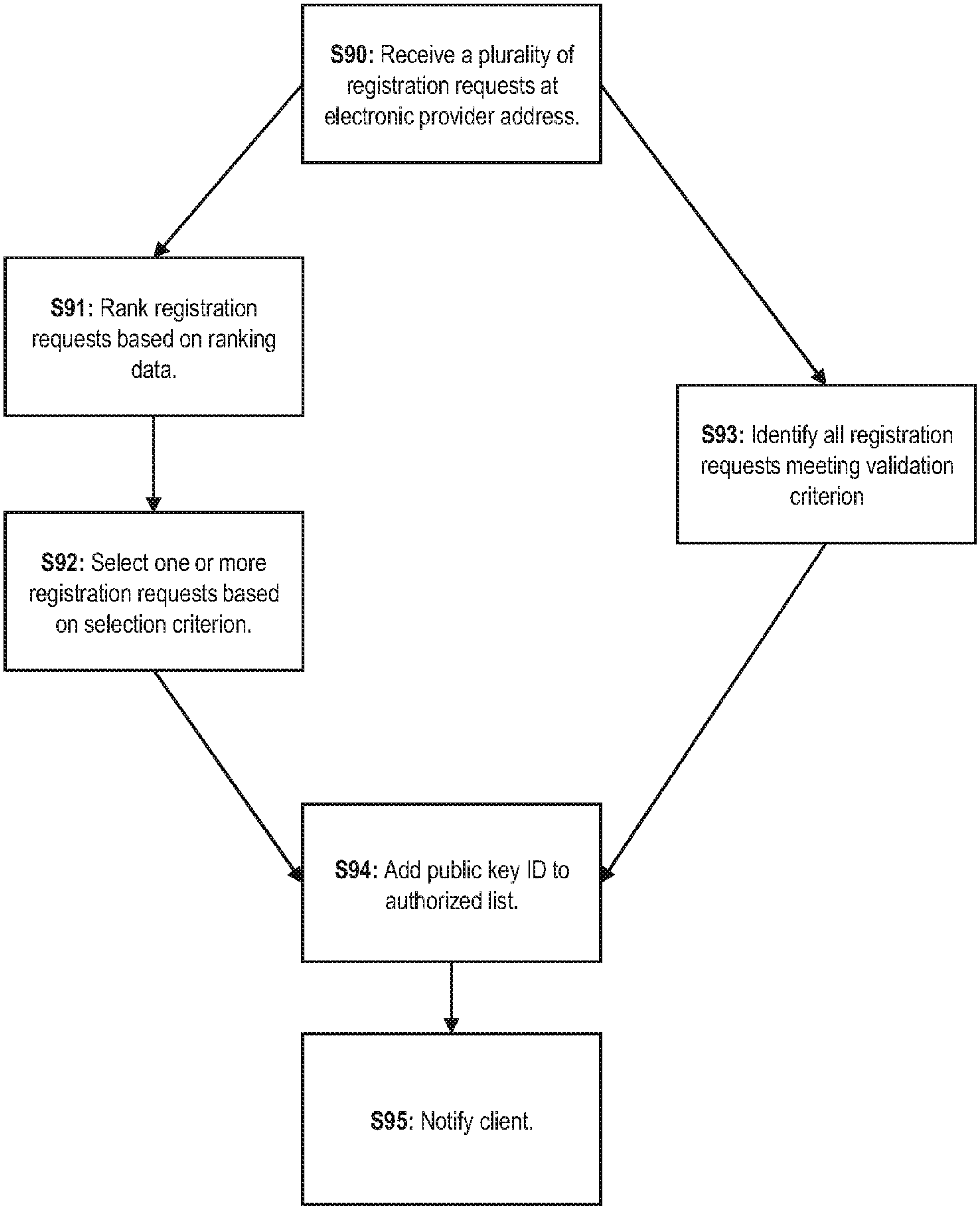
FIG. 9 is a flowchart illustrating a registration process according to the third and fourth aspects of the invention.

FIG. 9 shows a flowchart illustrating a registration process in which a subset of client devices 200 are selected from a plurality of registration requests 10. In a first step, S90 a plurality of registration requests 10 are received at the electronic provider address 400. These requests are not necessarily received at the same time, i.e. in one transmission. Rather, the plurality of registration requests 10 may comprise all of the registration requests 10 which are received before a predetermined deadline, or it may include a predetermined number of registration requests 10. There are two different approaches which may be taken in these cases in which a plurality of registration requests 10 are processed simultaneously. The first approach is shown in the left-hand branch of the flowchart in FIG. 9. Here, in step S91, the registration requests 10 are ranked based on some ranking data contained within the registration request 10, e.g. by the request management module 105, or a ranking module (not shown) thereof. The ranking data may be a value comprised in the registration request 10, e.g. the payload 12, thereof. Alternatively, the data could represent a time, a date, or a location—it is not important for the purposes of the invention. In some cases, after the ranking has taken place in step S91, all of the information apart from the public key IDs 20 may be discarded. Alternatively, the data (e.g. one or more of the payload 12, the client address 18, the public key ID 20, and encryption key 22) may be stored in the registration request data 112. In step S92, a subset of the registration requests 10 (or public key IDs 20 thereof) are selected based on some selection criterion, by the request management module 105, or a selection module (not shown) thereof. This selection criterion may specify how many of the requests 10 to select (e.g. the top 10, the top 100), a minimum or maximum value of a data item in a payload (e.g. all registration requests 10 with a payload value of 10 or more, or a payload value of no more than 100). Whatever the selection criterion, the outcome is the same: a subset of the registration requests 10 which have been ranked, and meet some selection criterion. In an alternative, though similar, case, shown in the right-hand branch of FIG. 9, the request management module 105 may identify a subset of the received registration requests 10 which meet a validation criterion. This process may be done in the same way as set out in step S42 of FIG. 4, explained earlier in this application. In one non-limiting example, the electronic provider address 400 may be a blockchain wallet. In that case, this process may be used only to select the subset of client devices 200 which have submitted a sufficiently high bid, or have submitted one of the top N bids. After the appropriate subset has been selected in either step S92 or step S93, in step S94, the public key IDs 20 associated with the successful client devices 200 (i.e. those which have been selected in the previous steps) are added by the authorized client management module 106 to the authorized list 112. The client devices 200 may then be notified in step S95. In the context of users bidding for a service, it is feasible that later bidders may come along and submit a bid which is higher than e.g. the lowest bid which has already been obtained. As a result, the later bidder should be able to overtake the lowest registered bidder in the ranking. Accordingly, the process shown in FIG. 9 may be repeated periodically, in order to ensure that the authorized list 110 of public key IDs 20 accurately reflects the subset of bidders who made the highest offers (or offers exceeding a threshold value). The repeats of the process are preferably based on any new registration requests 10 which are received, as well as the registration request data 112 stored in the memory 104 of the access management module 100.

In these cases, after the authorized list 110 has been generated, or updated, the process by which client devices 200 request access to the electronic resource 300 may be the same as shown in FIGS. 5 and 6. The session key may be updated in the same way as shown in FIG. 7, too.

Figure 10:
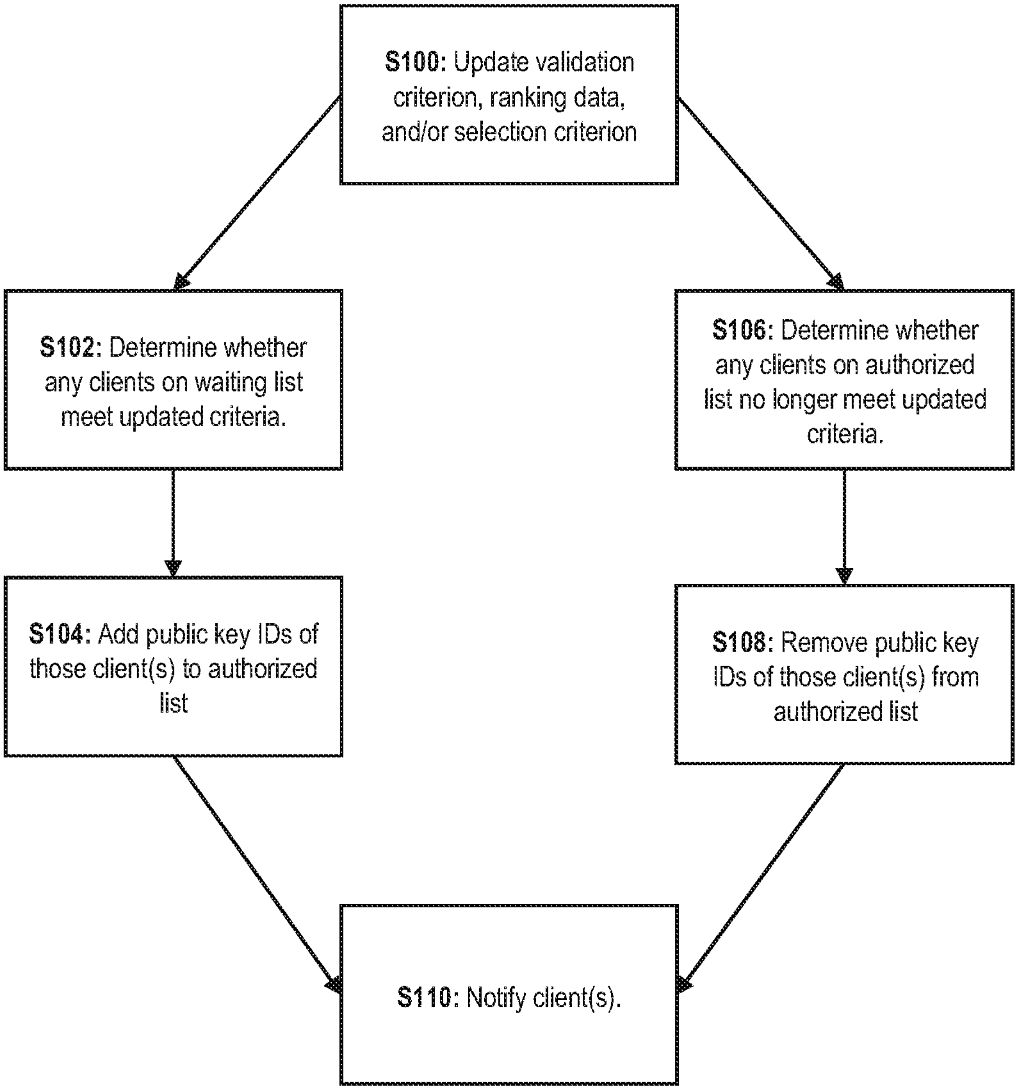
FIG. 10 is a flowchart illustrating a process in which the validation criterion/selection criterion/ranking data are changed.

As well as updating the authorized list 110 based on new incoming registration requests 10, the validation criterion or selection criteria may also be updated, essentially changing the threshold based on which client devices 200 are authorized. In some cases during the registration process of FIG. 9, some of the client devices 200 will not make it onto the authorized list 110. In preferred cases, these unsuccessful registration requests 10 will be placed on a waiting list, which may be stored on the memory 104 of the access management system 100. The waiting list may take a similar form to the registration request data 112, except only containing data relating to client devices 200 whose associated public key IDs 20 are not present in the authorized list 110. In step S100 of FIG. 10, one or more of the validation criterion, the selection criterion and/or ranking data are updated e.g. by the request management module 105. Herein, when we refer to the "ranking data" being updated, this may refer to the data contained within the registration request which is actually considered during the ranking (e.g. changing to ranking by a time/date of a request, rather than a geographical location). There are two scenarios: in some cases, previously rejected registration requests 10 may now meet the criteria, and in other cases previously allowed registration requests 10 may no longer meet the criteria. These are considered on separate branches of FIG. 10. In step S102, the registration request module 105 (or another component) may determine whether there are any client devices 200 on the waiting list who meet the updated criteria. In cases where the criteria relates to e.g. a top N of registration requests 10, then it may be necessary to consider the client devices 200 on both the authorized list 110 and/or registration request data 112 as well as the waiting list, because if a new client device 200 is to meet the criteria, then it follows that one of the client devices 200 on the authorized list 110 no longer meets the criteria. Then, for all the client devices 200 whose registration requests 10 are now deemed to meet the updated criteria, their respective public key IDs 20 may be added to the authorized list 110 in step S104. On the other hand, in step S106, the registration module 105 (or another component) may determine whether there are any client devices 200 (or public key IDs 20 corresponding to client devices 200) which no longer meet the updated criteria. Again, in cases where the criteria relate to e.g. a top N of registration request 10, then it may be necessary to consider both the authorized list 110 and the waiting list. Then, in step S108, those determined client devices 200, more specifically the public key IDs associated therewith, may be removed from the authorized list 110. Subsequently, in step S110, all of the affected client devices 200 are informed of the changes.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An access-management system comprising:

at least one memory; and at least one hardware processor coupled to the at least one memory and configured to:

determine whether a registration request received at a provider address associated with a service provider is valid, wherein the registration request includes a public key associated with a client device from which the registration request is received;

based on determining that the registration request is valid, add the public key to an authorized list;

use the public key to encrypt a session key to generate an encrypted session key; and send the encrypted session key to the client device, wherein the session key is usable to access an electronic resource of the service provider at a resource address.

2. The access-management system of claim 1, wherein, to determine whether the registration request is valid, the at least one hardware processor is configured to determine whether the registration request meets a validation criterion.

3. The access-management system of claim 1, wherein the at least one hardware processor is configured to:

receive a plurality of registration requests at the provider address;

determine whether each registration request of the plurality of registration requests is valid, wherein each registration request of the plurality of registration requests comprises a respective public key ID associated with a respective client device from which the respective registration request is received; and add the respective public key ID of the respective client device associated with each valid registration request of the plurality of registration requests to the authorized list.

4. The access-management system of claim 3, wherein the at least one hardware processor is configured to:

receive an access request from a client device, the access request indicating that the client device would like to access the electronic resource stored at the resource address and including the respective public key ID associated with the client device;

determine whether the respective public key ID which is included in the access request is included in the authorized list; and in response to determining that the respective public key ID is included in the authorized list, grant the client device access to the electronic resource.

5. The access-management system of claim 4, wherein the public key is retrieved either from the access request or the registration request received from the client device.

6. The access-management system of claim 5, wherein at least one of:

the session key is usable by the client device only once in order to access the electronic resource; or the session key is a rotating session key which changes to a new session key after a predetermined period of time; and when the session key changes, the at least one hardware processor is configured to encrypt the new session key with the public key of each client device whose public key ID is included in the authorized list in order to generate a new encrypted session key, and to send the new encrypted session key each client device.

7. An access-management system comprising:

at least one memory; and at least one hardware processor coupled to the at least one memory and configured to:

process a plurality of registration requests received at an electronic provider address, each registration request of the plurality of registration requests including a respective public key ID associated with a respective client device from which the respective registration request is received, wherein, to process the plurality of registration requests, the at least one hardware processor is configured to:

identify valid registration requests from among the plurality of registration requests based on the valid registration requests meeting a predetermined validation criterion; and add each respective public key ID associated with each respective client device from which the valid registration requests were received to an authorized list, use public keys associated with public key IDs on the authorized list to encrypt a plurality of session keys to generate a plurality of encrypted session keys; and send the plurality of encrypted session keys to the respective client devices associated with the public key IDs on the authorized list, wherein the plurality of session keys are usable to access an electronic resource at a resource address.

8. The access-management system of claim 7, wherein the at least one hardware processor is configured to:

receive a plurality of access requests from a respective plurality of client devices, each access request indicating that a respective client device seeking to access the electronic resource stored at the resource address and including a respective public key ID associated with that client device;

determine whether the respective public key ID included in each respective access request is included in the authorized list; and in response to determining that a respective public key ID is included in the authorized list, grant associated client device access to the electronic resource.

9. The access-management system of claim 8, wherein the public keys are retrieved either from the plurality of access requests received from the respective client devices or the plurality of registration requests received from the respective client devices.

10. The access-management system of claim 7, wherein the at least one hardware processor is configured to place on a waiting list public key IDs of client devices whose public key IDs have not been added to the authorized list.

11. The access-management system of claim 10, wherein the at least one hardware processor is configured to:

change the predetermined validation criterion to updated criterion;

determine whether registration requests of the client devices associated with public key IDs that are included in the authorized list meet the updated criterion; and remove, from the authorized list, public key IDs associated with registration requests that do not meet the updated criterion.

12. The access-management system of claim 10, wherein the at least one hardware processor is configured to:

change the predetermined validation criterion to updated criterion;

determine whether registration request of client devices which have been placed in the waiting list meet the updated criterion; and add, to the authorized list, public key IDs associated with registration requests that meet the updated criterion.

13. The access-management system of claim 6, wherein:

the provider address is a blockchain address;

the registration request includes a signature generated using a private signature key of the client device from which the registration request is received; and the public key is a public verification key which is complementary to the private signature key.

14. A computer-implemented method of controlling access to an electronic resource, the method comprising:

determining whether a registration request received at a provider address associated with a service provider is valid, wherein the registration request includes a public key associated with a client device from which the registration request is received;

based on determining that the registration request is valid, adding the public key to an authorized list;

using the public key to encrypt a session key to generate an encrypted session key; and sending the encrypted session key to the client device, wherein the session key is usable to access an electronic resource of the service provider at a resource address.

15. The computer-implemented method of claim 14, wherein determining whether the registration request is valid comprises determining whether the registration request meets a validation criterion.

16. The computer-implemented method of claim 14, further comprising:

receiving a plurality of registration requests at the provider address;

determining whether each registration request of the plurality of registration requests is valid, wherein each registration request of the plurality of registration requests comprises a respective public key ID associated with a respective client device from which the respective registration request is received; and adding the respective public key ID of the respective client device associated with each valid registration request of the plurality of registration requests to the authorized list.

17. The computer-implemented method of claim 16, further comprising:

receiving an access request from a client device, the access request indicating that the client device would like to access the electronic resource stored at the resource address and including the respective public key ID associated with the client device;

determining whether the respective public key ID which is included in the access request is included in the authorized list; and in response to determining that the respective public key ID is included in the authorized list, granting the client device access to the electronic resource.

18. The computer-implemented method of claim 17, further comprising retrieving the public key either from the access request or the registration request received from the client device.

19. The computer-implemented method of claim 18, wherein:

the session key is usable by the client device only once in order to access the electronic resource; or the session key is a rotating session key which changes to a new session key after a predetermined period of time; and when the session key changes, encrypting the new session key with the public key of each client device whose public key ID is included in the authorized list in order to generate a new encrypted session key, and to send the new encrypted session key each client device.

* * * * *